United States Patent
Nagarkar et al.

(10) Patent No.: US 9,448,739 B1
(45) Date of Patent: Sep. 20, 2016

(54) EFFICIENT TAPE BACKUP USING DEDUPLICATED DATA

(75) Inventors: Kuldeep S. Nagarkar, Pune (IN); Ashish Govind Khurange, Hadapsar Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 1517 days.

(21) Appl. No.: 12/965,123

(22) Filed: Dec. 10, 2010

(51) Int. Cl.
*G06F 12/00* (2006.01)
*G06F 3/06* (2006.01)
*G06F 11/14* (2006.01)

(52) U.S. Cl.
CPC ......... *G06F 3/0641* (2013.01); *G06F 11/1453* (2013.01)

(58) Field of Classification Search
CPC .................................................. G06F 3/0641
USPC ........................................................ 711/161
See application file for complete search history.

(56) References Cited

U.S. PATENT DOCUMENTS

2009/0013129 A1* 1/2009 Bondurant ............ G06F 3/0608
711/115

* cited by examiner

*Primary Examiner* — Matthew Bradley
(74) *Attorney, Agent, or Firm* — Campbell Stephenson LLP

(57) ABSTRACT

Various systems and methods can be used to perform backup to tape. For example, one method involves detecting an amount of storage in a tape drive that is available for concurrent access. The method then compares the size of a plurality of backup images to the amount of storage prior to initiating an archive operation. The method then involves adding information identifying a backup image to a list of backup images to be included in an archive operation and performing the archive operation, which involves writing the backup images to tape drive.

20 Claims, 6 Drawing Sheets

| Backup image | Disk | Offset |
|---|---|---|
| A | 1 | 9 |
| A | 2 | 4 |
| B | 2 | 6 |
| B | 1 | 2 |
| B | 2 | 7 |
| A | 1 | 8 |

*FIG. 4A*

| Backup image | Disk | Offset |
|---|---|---|
| B | 1 | 2 |
| A | 1 | 8 |
| A | 1 | 9 |
| A | 2 | 4 |
| B | 2 | 6 |
| B | 2 | 7 |

*FIG. 4B*

| Backup image | Disk | Offset | Location |
|---|---|---|---|
| B | 1 | 2 | 1 |
| A | 1 | 8 | 2 |
| A | 1 | 9 | 3 |
| A | 2 | 4 | 4 |
| B | 2 | 6 | 5 |
| B | 2 | 7 | 6 |

*FIG. 4C*

| Backup image | Locations |
|---|---|
| A | 2,3,4 |
| B | 1,5,6 |

*FIG. 4D*

EFFICIENT TAPE BACKUP USING DEDUPLICATED DATA

FIELD OF THE INVENTION

This invention relates to backing up and restoring data and, in particular, to backing up and restoring deduplicated data using tape storage devices.

DESCRIPTION OF THE RELATED ART

Data storage media, such as random access memory (RAM) and hard disks, can be expensive. Tape storage devices can be used to provide low-cost, low-energy consumption, long-term data storage. Tape storage devices are sequential access memory and thus, unlike RAM and hard disks, read and write performance varies significantly depending on the distance between the position of the read head and the location of the desired data in the tape storage device. Also, tape storage devices typically consist of multiple tapes, of which only a given number can be mounted at any one time. This means that accessing data stored in a tape storage device can involve physically unmounting and mounting (swapping) tapes. Such physical swapping of tapes affects the time taken to access data stored in tape storage devices. In general, access to data stored on tape storage devices is slower than access to data on random access media. Additionally, as the amount of tape swapping increases, the amount of time taken to access data increases even more.

Given the costs associated with acquiring storage media, great lengths are taken to reduce the amount of storage space used to store a given amount of data. Data deduplication is one way to reduce the amount of storage space used to store a given amount of data. However, the nature of deduplicated data can present challenges when deduplicated data is stored in tape storage. One challenge is apparent when restoring deduplicated data from tape storage. If deduplicated data is stored across multiple tapes, restoring the data can involve repeated swapping of tapes, which can negatively impact restore performance by increasing the time taken to restore the deduplicated data.

SUMMARY OF THE INVENTION

Various systems and methods for performing archive operations to tape are disclosed. For example, one method involves detecting an amount of storage in a tape drive that is available for concurrent access. The method then compares the size of a plurality of backup images to the amount of storage prior to initiating an archive operation. The method then involves adding information identifying a backup image to a list of backup images to be included in an archive operation and performing the archive operation, which involves writing the backup images to tape drive.

In an embodiment, the list of backup images includes fingerprint values that identify a storage location for a block, a disk value, and an offset value. In this embodiment, the method involves sorting the fingerprints and modifying one or more of the fingerprints. In an embodiment, the backup images are backup images of an object and include deduplicated data. The method can write the backup images to the tape drive in the order specified by the list.

In an embodiment, the method involves creating a map that identifies storage locations for each backup image written to the storage device. This embodiment can also involve restoring an object using a backup image on the tape drive.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 4A is a table showing entries in a fingerprint database, according to one embodiment.

FIG. 4B is a table showing sorted entries in a fingerprint database, according to one embodiment.

FIG. 4C is a table showing modified entries in a fingerprint database, according to one embodiment.

FIG. 4D is a table showing a map of a tape storage device, according to one embodiment.

Figure 1:
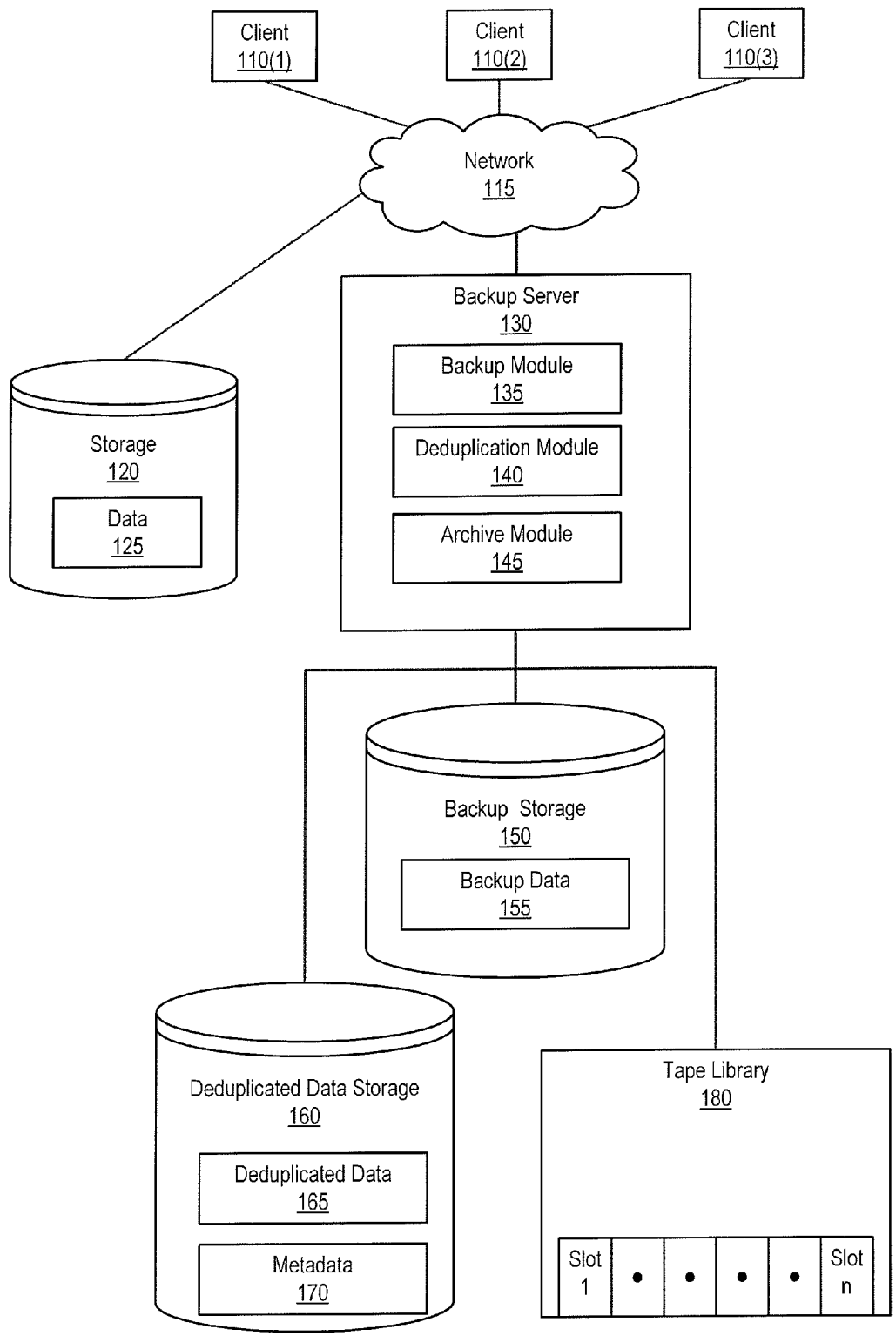
FIG. 1 is a block diagram of a computing system that includes an archive module, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Users, for example employees of a company, use computers to access data in the performance of various duties. Data can be stored in data storage media and can be accessed when convenient to the user. Data that is accessed frequently, regularly, or recently is commonly stored in a primary storage device that is readily accessible to users. Data that is used infrequently can be copied to long term archive storage. Data can be backed up to protect data against loss due to, for example, computer failure or user error.

A number of techniques are available to reduce the amount of storage used to store backed up data. One such technique is data deduplication, which produces deduplicated data, which can be stored in deduplicated data storage. In deduplicated data storage, only a single copy of a particular unit of data (e.g., a data block or chunk) is stored, rather than multiple redundant copies of the data. For example, a first snapshot can be made of data stored on a primary disk, where the data includes a first chunk. The snapshot, which includes the first chunk, can be stored in backup storage. A second snapshot that also includes the first chunk can be made of the data stored on the primary disk (e.g., at a later time) and stored in backup storage. If the first chunk did not change between the time the first snapshot was made and the time the second snapshot was made, backup storage contains two identical copies of the first chunk. Storing multiple copies of the same data is redundant and uses additional storage space.

In order to reduce the amount of storage space used to store backup data, the backup data can be deduplicated, producing a deduplicated backup image. In order to produce a deduplicated backup image, deduplication software can examine data (e.g., the first and second snapshots in the example above) and detect multiple copies of the same data. Instead of creating additional copies of the data that already exists in the deduplicated data storage device, the deduplication software instead stores an indication that the data already exists. The deduplication software also generates an indication of where in the deduplicated data storage device the data can be located. In this way, a single copy of the data is "shared" rather than storing multiple copies of the data. Deduplicating data can produce significant space savings. For example, a 50X space savings can be realized. This is just one example, and a larger or smaller deduplication ratio is possible.

Deduplicated backup images can be copied to a deduplicated data storage device. The indication of where the shared block is located can be stored in the deduplicated data storage device itself and/or can be stored, for example, on a backup server. The deduplicated data storage device can be a separate storage device, or can be a designated area, such as a partition or disk in a storage device.

Data, such as backup data, can also be archived for long term storage purposes. For example, backup images can be streamed from deduplication storage to tape. Tape has advantages of being relatively inexpensive, reliable, and does not consume power when not being accessed.

When archiving from deduplicated storage, one approach is to copy the data from the deduplicated storage to tape in replica fashion. That is, an exact copy of the data in deduplicated storage can be produced in tape storage. This method preserves the space reduction achieved by deduplicating the data. However, depending on the size of the deduplicated data storage, this can still consume a large number of tapes, and the data can be organized such that restoring from such a replica is inefficient (e.g., requires tape swapping).

In order to restore archived data from tapes, the data can be read from tape media and written to, for example, primary storage. Tape libraries typically provide a fixed number of slots that can be used for restore. That is, the number of tapes that can be mounted at any given time is equal to the number of slots in the tape library. Of the total number of slots, a set number is typically designated for backup operations, and the remaining slots are designated for restore operations. In many cases, the amount of data in a deduplicated data storage device is too large to fit in a single tape or set of tapes that are designated for restore operations. This can lead to poor performance if a restore is performed from tape. That is, when a deduplicated backup image is stored in a deduplicated data storage device, it is likely that any shared blocks are stored in various non-sequential locations throughout the backup image. When the backup image is streamed to tape, the shared blocks can likewise be scattered among multiple tapes.

Not only does keeping track of the locations of shared blocks present a challenge, retrieving the shared blocks can present challenges. If the deduplicated backup image is stored across a greater number of tapes than there are slots for restore, restoring the backup image can involve mounting and unmounting tapes. Take an example in which a replica is made of deduplicated storage. In this example, the deduplicated data is spread across 50 tapes. If the tape library has only 10 slots for restore operations, restoring a selected backup image can involve a considerable amount of tape swapping, resulting in an inefficient process.

An alternative approach to creating a replica in tape of a deduplicated data storage device is to rehydrate data from the deduplicated storage device prior to archiving the data to tape. Rehydrating involves writing a copy of each shared block into each backup image that shares the block. A problem with rehydration is that rehydrated (reduplicated) data uses a relatively large amount of space, and the space reductions provided by the deduplication process are lost. This means that a relatively large amount of tape storage is used. This increases the likelihood of mounting and unmounting tapes to restore backup images, which slows the restore process. Consider an example where a deduplicated storage device stores 32 terabytes of data. If the deduplication ratio is 50×, the deduplicated storage device essentially stores 1600 terabytes of data (32*50). Thus, writing rehydrated data to tape will consume 1600 terabytes of space. Not only does the increased capacity increase the cost of the tape storage system, but writing the additional data takes time and thus introduces delay into the archive process, which is generally undesirable.

Also, the rehydration process itself introduces delay. That is, identifying the storage locations of the shared blocks and retrieving data from the identified locations in the deduplicated storage device takes time. Since the shared blocks are typically scattered throughout the deduplicated storage, accessing the deduplicated storage involves searching for various locations throughout the deduplicated storage. This process is inefficient and introduces additional delay into the archive operation.

It would be advantageous if the tape archive could retain the storage space reduction benefits realized by the deduplicated storage. It would also be advantageous if the data being archived could be read sequentially (streamed) from deduplicated storage.

FIG. 1 is a block diagram of a computing system that includes an archive module that performs archive operations using deduplicated data. The system of FIG. 1 includes clients 110(1), 110(2), and 110(3) coupled to storage 120 and a backup server 130 by a network 115. Storage 120 includes data 125. Backup server 130 includes a backup module 135, deduplication module 140, and archive module 145. Backup server 130 is also coupled to backup storage 150, which includes backup data 155, deduplicated data storage 160, which includes deduplicated data 165 and metadata 170, and tape library 180, which includes slots 1 through n.

Clients 110(1), 110(2), and 110(3) (collectively referred to as clients 110) and backup server 130 can each include one or more computing devices. Such computing devices can include servers, personal computing devices, laptop computers, net books, personal digital assistants, cellular phones, or the like.

Storage 120, backup storage 150, and deduplicated data storage 160 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Storage 120, backup storage 150, and deduplicated data storage 160 can also include arrays of such storage devices. Storage 120 can be included within, directly connected to, or connected via a network to clients 110.

One or more applications (not shown) running on one or more of clients 110 can access data 125 in storage 120. Data 125 can include various types of files and other data items, or objects, such as emails, journal entries, contacts, notes, web documents, word documents, spreadsheets and the like. Access to data 125 can include, for example, reading, writing, copying, relocating, or otherwise modifying data 125.

Backup server 130 can backup data 125 by copying or moving all or a portion of data 125 to backup data 155 in backup storage 150. Backup data 155 can include one or more backup files or backup images, such as a full backup image, an incremental backup image, a synthetic backup image, and the like. Such backup images can be generated by enterprise backup software such as, for example, Symantec NetBackup products, Symantec BackupExec products, and the like.

Backup module 135 can create a snapshot of a data source (e.g., file or object) in data 125 and add the snapshot to backup data 125. In an embodiment, backup module 135 periodically creates snapshots of an object, such as a file, database, volume, or virtual machine, stored in data 125 and stores the snapshots in backup data 155. Each snapshot includes a backup image of the object. This can result in multiple copies of the same data being stored in backup data 155, which increases the amount of storage used in backup data 155. For example, a first backup image of an object can include of 100 chunks of data. A second backup image of the object, made at a later time, can also include of 100 chunks of data. However, of the 100 chunks of data in the second backup image, 80, for example, can be identical, or unchanged, since the first backup image was created. Thus, the first and second backup images have 80 common chunks and 20 uncommon chunks. Storing two copies of the 80 common chunks is redundant.

Deduplication module 140 can create deduplicated backup images from backup data 155 and store the deduplicated backup images in deduplicated data 165. In an embodiment, deduplication module 140 selects a backup image in backup data 155 to deduplicate. Deduplication module 140 determines whether each chunk of data in the selected backup image already exists in deduplicated data 165. Deduplication module 140 can calculate a signature (e.g., hash or checksum) for each chunk and compare the signature to signatures stored in metadata 170. If the signature is found, the chunk already exists in deduplicated data 165 and deduplication module 140 does not copy the chunk to deduplicated data 165. If the signature is not found, the chunk does not exist in deduplicated data and deduplication module 140 copies the chunk to deduplicated data 165 and adds the signature to metadata 170. In an embodiment, signatures are known as fingerprints and are stored in a fingerprint database in metadata 170.

Deduplication module 140 can process all the chunks in a selected backup image in this way. This allows a reduction in space consumed in storing the backup images as copying a backup image to deduplicated data storage avoids copying those chunks that are already stored in deduplicated data storage. Instead, deduplication module can store a pointer indicating where the previously stored (common) chunk is located. Those chunks that are already stored (e.g., as common chunks that are part of another backup image) are "shared." That is, if a user attempts to access a shared chunk in a backup image, access can be redirected to the chunk that was already stored, or the shared chunk.

The system of FIG. 1 also includes archive module 145. Archive module 145 can create archive copies in tape library 180 of backup images stored in deduplicated data storage 160. Archive module 145 can also restore data from tape library 180. Archive and restore operations are described in greater detail in regard to FIGS. 2 and 3, respectively. Tape library 180 has n slots. A tape (not shown) can be mounted in each slot. Data can be written to a mounted tape (e.g., in a backup operation) or data can be read from a mounted tape (e.g., in a restore operation). A certain number of the slots in tape library 180 can be reserved for restore operations.

Figure 2:
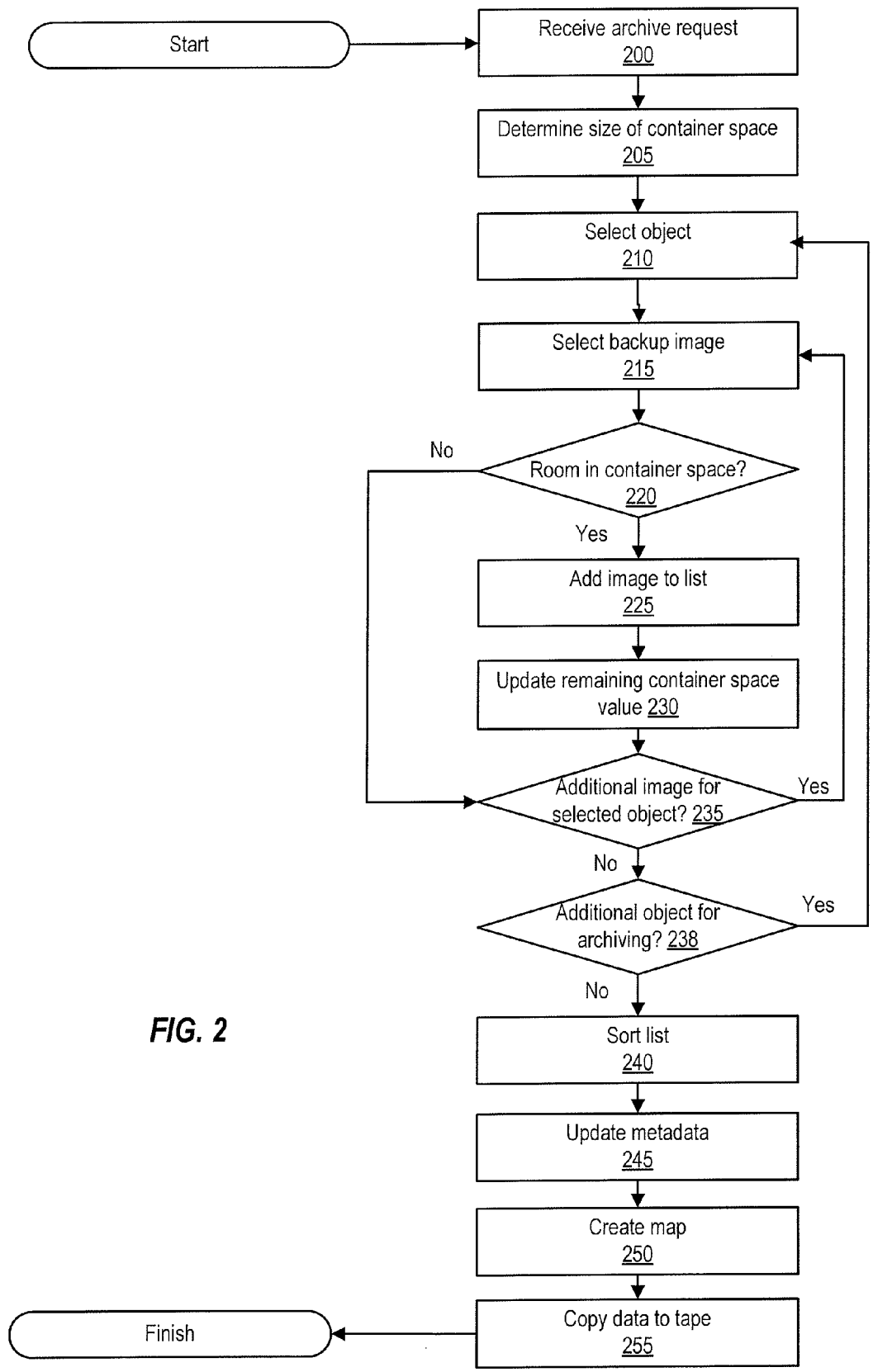
FIG. 2 is a flowchart of a method of performing a backup operation, according to one embodiment.

FIG. 2 is a flow diagram of a method of performing an archive operation. The method can be performed by the system of FIG. 1, in particular by a backup server, such as backup server 130 of FIG. 1, which includes an archive module, such as archive module 145 of FIG. 1. The backup server operates in conjunction with a tape library, such as tape library 180 of FIG. 1, and a deduplicated storage device, such as deduplicated data storage 160 of FIG. 1.

The method begins when an archive module receives an archive request, e.g., from a backup server, at 200. The archive request can identify data to be archived, e.g., an object, one or more backup images, portions of backup images, or storage locations (e.g., tracks, volumes, or disks).

The archive module determines the size of a container space at 205. The container space represents an amount of data that a tape library can provide restore access to at one time. In order to determine the size of the container space, the archive module can multiply the number of slots in the tape library reserved for restore (restore slots) by the size of the tapes that can be mounted in the restore slots. This gives the maximum amount of data that can be restored without unmounting and remounting any tapes. The container space can be subdivided into multiple containers.

Next, the archive module selects an object to archive at 210. This can be an object specified by the archive request or an object that has backup images stored in a disk specified by the archive request. The selection can be based on information regarding a particular object, such as how many backup images of the object are stored in deduplicated data storage. A selected object can have a number of backup images. These images can represent the state of the object at various times. The archive module can create a list of all backup images of the selected object. In an embodiment, archive module selects backup images of the same object, as such backup images are likely to share a relatively high percentage of blocks with each other as compared to the percentage of blocks shared by backup images of different objects.

At 215, the archive module selects a backup image of the selected object. The backup image can be specified in the archive request. In an embodiment, the archive module can traverse, e.g., in order, the list of all backup images for the selected object. In another embodiment, the archive module can select a backup image based, for example, on the chronological order of creation of the backup images, the location of the backup image in deduplication data storage, or how many shared blocks are present in backup images of the object stored in deduplicated data storage. For example, the archive module can detect the percentage of blocks shared between a first backup image and a second backup image and compare the percentage with the percentage of blocks shared between the first backup image and other backup images. The archive module can select a backup image to archive based on this comparison. That is, the archive module can select a backup image with a relatively high percentage of shared blocks in order to maximize storage space utilization benefits of deduplication.

Next, the archive module compares the size of the selected backup image with the available space in the container space, at 220. In an embodiment, the archive module detects the size of the selected backup image by detecting the size of each chunk of the backup image, and summing the sizes of the chunks. In an embodiment, the archive module identifies each chunk in the backup image by accessing a fingerprint database. A fingerprint identifies a chunk of an image, the disk the chunk is stored on, and an offset into the disk. A fingerprint can also identify a content router that can be used to access the chunk. Fingerprints for some or all of the chunks of data stored in deduplicated data storage can be stored in a database called a fingerprint database. The fingerprint database can be stored in deduplicated data storage or on the backup server.

If the container space has enough room to store the selected backup image, the archive module adds information identifying the backup image to a list, at 225, referred to herein as a fingerprint database map. The information can include the fingerprints of the chunks of the backup image. Backup images identified by the list are selected to be included in the archive operation. If the container space does not have enough room to store the selected backup image, the archive module determines whether additional backup images for the selected object are stored in deduplicated data storage, at 235, as discussed below.

After adding information identifying the backup image to a list of backup images, the archive module updates the remaining size in the container space, at 230. The archive module subtracts the size of the added backup image from the remaining size of the container space. The archive module can use the calculated size of the backup image (as discussed above) for this operation. In an embodiment, the archive module allocates a portion of the container space for metadata. The archive module can subtract the size of the allocated portion from the total size of the container space.

At 235, the archive module detects whether deduplicated data storage stores any additional backup images of the selected object. If so, the method returns to 215, where the archive module selects a next backup image to archive and detects (at 220) whether there is room for the next backup image to be added to the container space. If so, information identifying the backup image is added to the list. This process repeats until all backup images of an object have been considered and added to the list. Alternatively, backup images can be added to the list until the archive module detects that the combined size of the backup images added to the list is equal to the size of the container space, or that the container space will be filled completely by the backup images identified in the list. In one example, all backup images of a given object will be added to a list to be archived to a set of tapes where each tape can be mounted concurrently. That is, all backup images added to the list can be restored from tape without having to swap any tapes. The backup images can be backup images of the same object or of multiple different objects.

At 238, the archive module detects whether additional objects remain to be archived. This can occur, for example, when the archive request specifies multiple objects. In an embodiment, the container space can accommodate all backup images for a single object without becoming completely full. In this embodiment, an additional object is selected (at 210), and the process repeats. This can result in backup images for multiple objects being stored in the same container space.

At 240, the archive module sorts the list. In an embodiment, the list includes information identifying chunks of backup images that were added to the list. The information identifying the chunks can be sorted into an ascending order by disk and location (offset) on the disk, such that reading chunks from the deduplicated data storage in the order specified by the sorted list results in a sequential, in-order read of the deduplicated storage device. This allows the data to be copied from the deduplicated data store to the tape library in a single pass of the deduplicated data store. In an embodiment, sorting the list provides an incremental improvement in the amount of time required to read the chunks from the deduplicated data storage device by reducing non-sequential reads without ensuring a single pass read.

At 245, the archive module updates metadata by assigning a number to each chunk in the list. In an embodiment, the number is simply a sequential number that identifies the position of the chunk in the sorted list. For example, the chunks can be numbered from 0 to n, where n is the number of chunks in the list. The number can be added to the chunks' fingerprints or otherwise associated with the chunks.

At 250, the archive module creates a map that identifies the backup images and the locations in the tape library that store chunks for each backup image, referred to herein as an image map. The archive module can use this map during a restore operation. For example, if a restore request specifies a particular backup image, the archive module can use the image map to identify the locations that store chunks associated with the specified backup image. The archive module can read data from the specified locations to restore the specified backup image. At 255, the archive module stores the image map in the tape library and then copies the chunks in the list from deduplicated data storage to the tape library. In an embodiment, the image map can be stored in deduplicated data storage or in other storage devices. For example, the image map can be added to a catalog database that identifies archived objects, the containers that store the archived objects, and/or locations in the containers of backup images of the objects.

Figure 3:
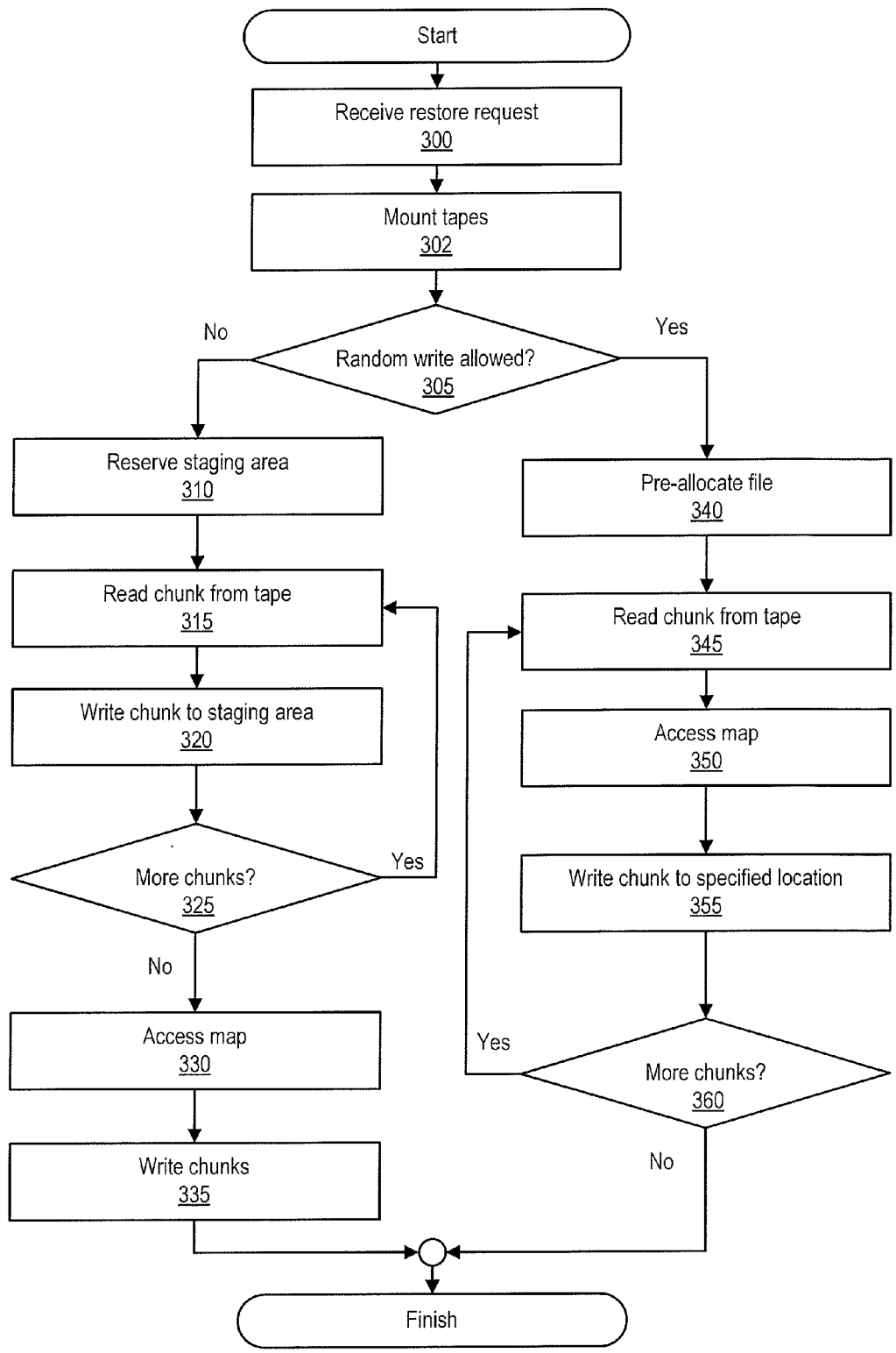
FIG. 3 is a flowchart of a method of performing a restore operation, according to one embodiment.

FIG. 3 is a flowchart of a method of performing a restore operation. The method can be performed by a backup server, such as backup server 130 of FIG. 1, which includes an archive module, such as archive module 145 of FIG. 1. The backup server operates in conjunction with a tape library, such as tape library 180 of FIG. 1, and a storage device, such as storage 120 of FIG. 1.

The method begins at 300, when an archive module receives a restore request from a backup server. The restore request can specify an object or backup image stored in the tape library. The archive module then identifies a container, or set of tapes, and indicates that the set of tapes should be mounted in the tape library. For example, the archive module can access a catalog database to identify the set of tapes that stores the specified backup image. At 302, the indicated set of tapes is mounted in the tape library.

The restore request can also specify a destination, or target storage device. This is the device to which the restored data is to be written. At 305, the archive module determines whether the target storage device allows random access writes. This depends on the type and configuration of the storage device.

If random writes are not allowed, the archive module reserves a staging area at 310. The staging area can be located in the target storage device or in another storage device. The archive module can determine the size of the staging area by calculating the size of the backup image specified by the restore request.

At 315, the archive module reads a chunk of data from the tape library. At 320, the archive module writes the chunk to the staging area.

At 325, the archive module detects whether there are more chunks. If so, the process returns to 315, where the archive module reads another chunk. Otherwise, the archive module accesses a map at 330. Accessing a map can involve accessing a fingerprint database map. The archive module can determine, from the fingerprint database map, the locations or order in which to store the chunks in the staging area. At 335, the archive module copies the chunks from the staging area to the target location, e.g., as specified by the restore request. Alternatively, the chunks can be stored in the staging area until requested by, for example, a requesting application.

If, at 305, the archive module detects that random writes are allowed the archive module pre-allocates a file at 340. The archive module can determine the appropriate size of the file, for example, by accessing a fingerprint database map and determining the total size of all chunks being restored. At 345, the archive module reads a chunk from the tape library. The archive module accesses a map at 350. The archive module can determine, based on the map, or fingerprint database, the location in the file of the chunk that was just read. For example, the map can specify that the chunk is the $i^{th}$ chunk of a backup image. The archive module can store the chunk in the $i^{th}$ location of the pre-allocated file, at 355. At 360, the archive module detects whether there are more blocks. If so, the method loops to 345, where the archive module reads another block. Otherwise, the method ends.

FIG. 4A is a table showing entries in a fingerprint database. The fingerprint database is stored, in an embodiment, in metadata, e.g., metadata 170 of FIG. 1. In this embodiment, the fingerprint database is created and modified by a deduplication module, e.g., deduplication module 140 of FIG. 1, e.g., when data writes are received at a deduplicated data storage device, e.g., deduplicated data storage 160 of FIG. 1. As shown, the table includes columns for a backup image identifier, a disk identifier, and an offset identifier. Each row is a fingerprint, and identifies a chunk of data stored in deduplicated data storage, such as deduplicated data storage 160 of FIG. 1. The table in FIG. 4A shows that backup image A includes three chunks of data. A first chunk of backup image A is stored on disk 1, at offset 9. A second chunk of backup image A is stored on disk 2, at offset 4. A third chunk of backup image A is stored on disk 1, at offset 8. Backup image B also includes three chunks of data. A first chunk of backup image B is stored on disk 2, at offset 6. A second chunk of backup image B is stored on disk 1, at offset 2. A third chunk of backup image B is stored on disk 2, at offset 7.

FIG. 4B is a table showing sorted entries in a fingerprint database. The table has been sorted in ascending order such that the chunks identified by the table can be read from the front to the back of the deduplicated storage device in a single pass. That is, a read head, or the like can read the chunks by starting at the first location of the deduplicated storage device and advanced to the last location of the deduplicated storage device without reversing direction.

FIG. 4C is a table showing modified entries in a fingerprint database. An additional column identifies the order in which the chunks are to be read from deduplicated data storage and written to tape, such as tape library 180 of FIG. 1. A chunk of backup image B is stored at disk 1, offset 2. This chunk is the first chunk in the deduplicated data storage. That is, this chunk is at the location closest to the beginning of the deduplicated storage device of any of the chunks identified in the fingerprint database. The chunk at the location that is the second closest to the beginning of the deduplicated storage device is a chunk of backup image A stored at disk 1, offset A. The first chunk is assigned the number 1, and the second chunk is assigned the number 2, e.g., by an archive module, such as archive module 145 of FIG. 1. The rest of the chunks in the fingerprint database are sequentially numbered similarly.

FIG. 4D is a table showing a map of a tape storage device. The table can be stored, e.g., by an archive module, such as archive module 145 of FIG. 1, in a tape library, such as tape library 180 of FIG. 1, and can be used by the archive module to identify which locations in the tape library contain chunks of data belonging to the specified backup image. For example, backup image A has chunks of data stored at the $2^{nd}$, $3^{rd}$, and $4^{th}$ locations in the tape library. Backup image B has chunks of data stored at the $1^{st}$, $5^{th}$, and $6^{th}$ locations in the tape library.

Figure 5:
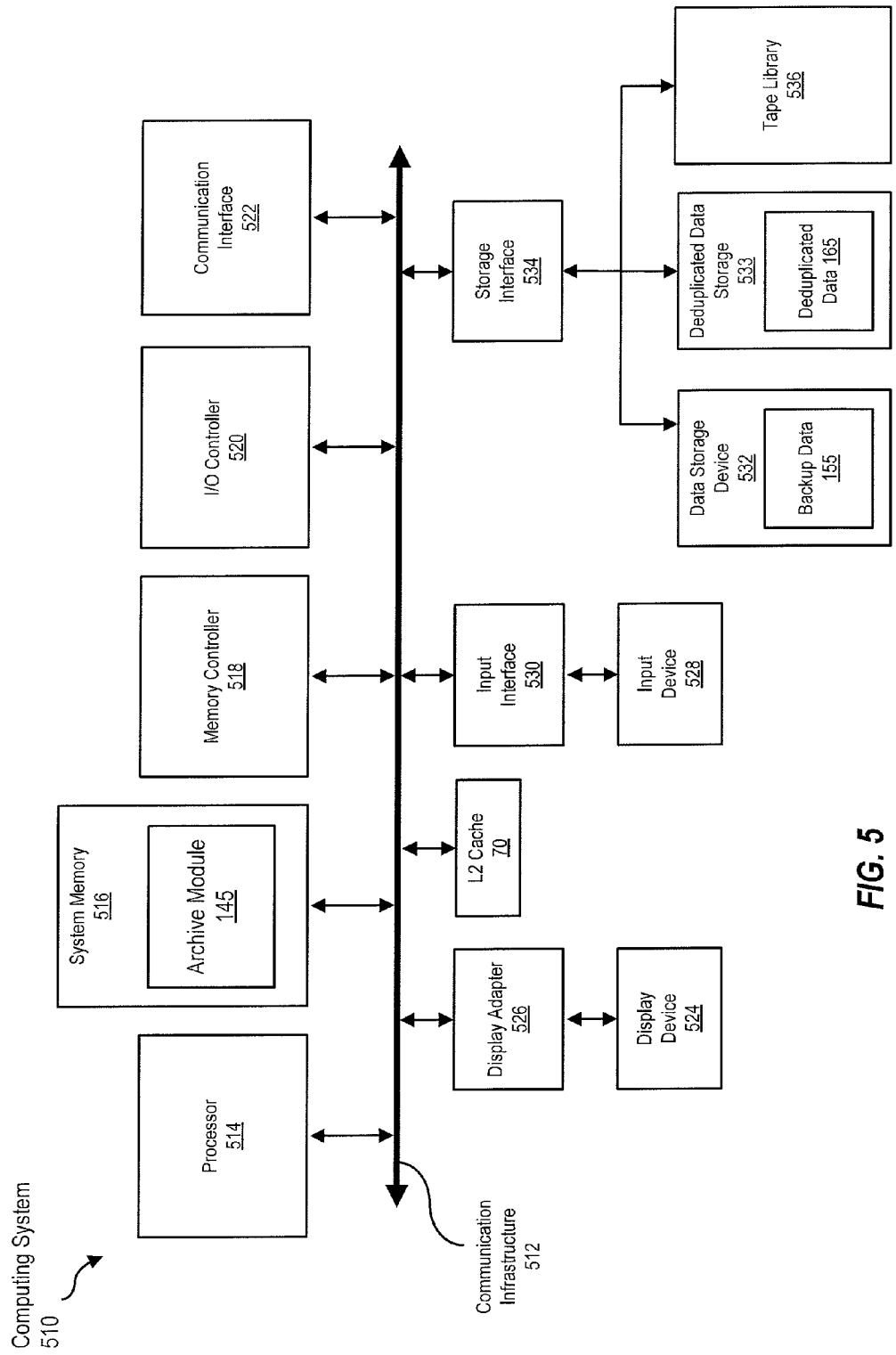
FIG. 5 is a block diagram of a computing device, illustrating how an archive module can be implemented in software, according to one embodiment.

FIG. 5 is a block diagram of a computing system 510 capable of implementing an archive system as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements an archive module 145, computing system 510 becomes a special purpose computing device that is configured to participate in archive operations.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing an archive module 145 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a backup storage device 532, a deduplicated data storage device 533, and a tape library 536 coupled to communication infrastructure 512 via a storage interface 534. Storage devices 532 and 533 generally represent any type or form of storage device or medium capable of storing data and/or other computer-readable instructions. For example, storage devices 532 and 533 may each include a magnetic disk drive (e.g., a so-called hard drive), a floppy disk drive, an optical disk drive, a flash drive, or the like. Storage interface 534 generally represents any type or form of interface or device for transferring data between storage devices 532, 533, and 536 and other components of computing system 510.

In certain embodiments, storage devices 532, 533, and 536 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532, 533, and 536 may also include other similar structures or devices for allowing computer software, data, or other computer-readable instructions to be loaded into computing system 510. For example, storage devices 532, 533, and 536 may be configured to read and write software, data, or other computer-readable information. Storage devices 532, 533, and 536 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
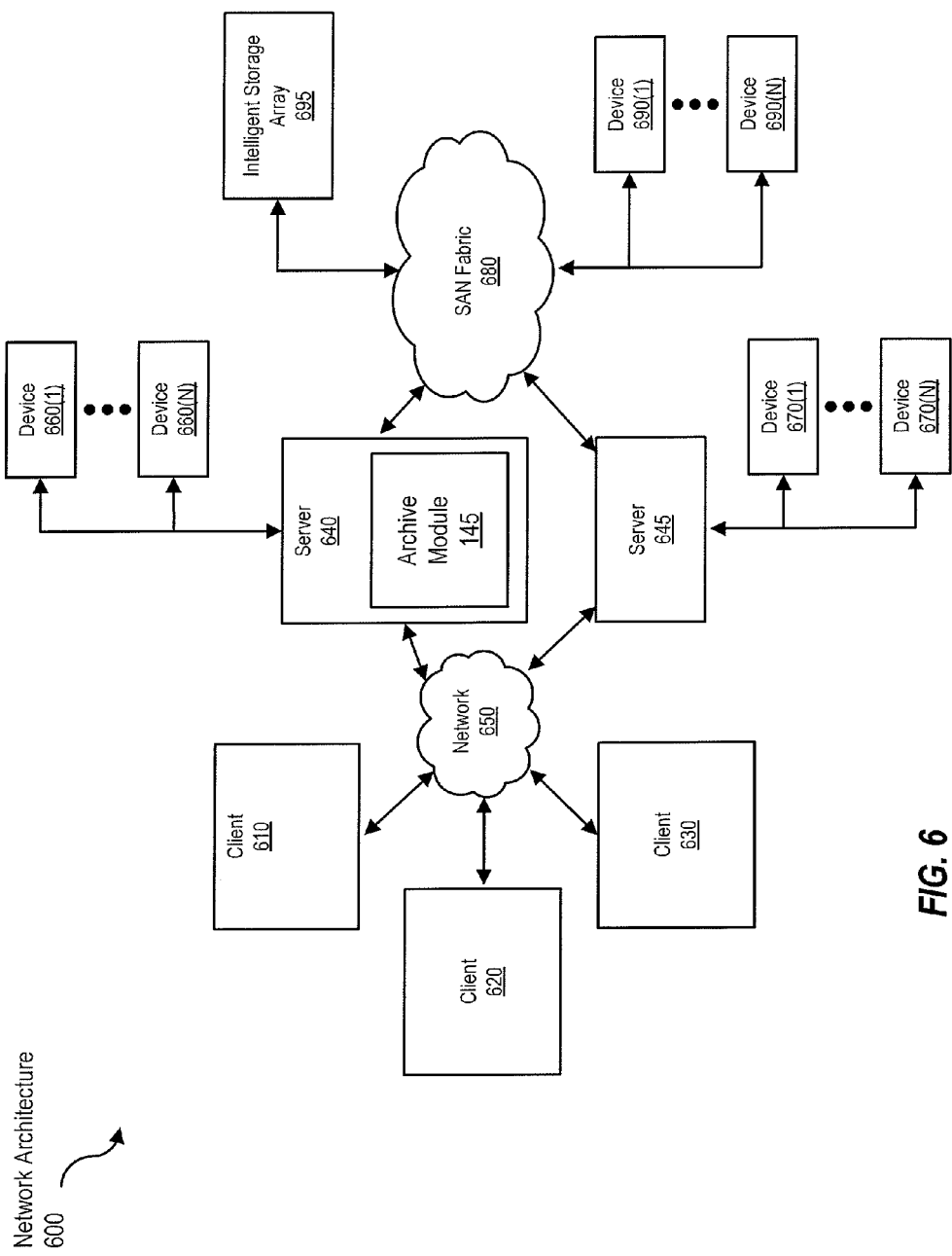
FIG. 6 is a block diagram of a networked system, illustrating how various computing devices can communicate via a network, according to one embodiment.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include an archive module 145 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archive module in FIG. 1 may transform behavior of a computing device in order to cause the computing device to perform archive operations of data between various storage devices.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    in response to a request to perform an archive operation,
        detecting an amount of storage in a set of storage devices, wherein
            the set of storage devices comprises a tape drive, and
            the amount of storage is available for access at one time;

selecting a backup image of a plurality of backup images to be included in the archive operation;
prior to initiating the archive operation, comparing a size of the backup image to the amount of storage,
adding information identifying the backup image to a list, wherein
the list identifies the plurality of backup images, and
the plurality of backup images are to be included in the archive operation;
performing the archive operation, wherein
the performing the archive operation comprises writing the plurality of backup images to the set of storage devices.

2. The method of claim 1, wherein
the list comprises a plurality of fingerprint values, and
each fingerprint value of the plurality of fingerprint values identifies a storage location for a block, a disk value, and an offset value.

3. The method of claim 2, further comprising:
sorting the plurality of fingerprint values.

4. The method of claim 2, further comprising:
modifying a fingerprint of the plurality of fingerprint values.

5. The method of claim 1, wherein
the plurality of backup images comprises backup images of an object, and
the plurality of backup images comprises deduplicated data.

6. The method of claim 1, wherein
the writing is performed in an order specified by the list.

7. The method of claim 1, further comprising:
creating a map that identifies a plurality of storage locations for each backup image written to the set of storage devices.

8. The method of claim 1, further comprising:
restoring an object using a selected backup image of the plurality of backup images stored on the set of storage devices.

9. A system comprising:
one or more processors; and
memory coupled to the one or more processors, wherein the memory stores program instructions executable by the one or more processors to:
in response to a request to perform an archive operation, detect an amount of storage in a set of storage devices, wherein
the set of storage devices comprises a tape drive, and
the amount of storage is available for access at one time;
select a backup image of a plurality of backup images to be included in the archive operation;
prior to initiating the archive operation,
compare a size of the backup image to the amount of storage,
add information identifying the backup image to a list, wherein
the list identifies the plurality of backup images, and
the plurality of backup images are to be included in the archive operation; and
perform the archive operation, wherein
performance of the archive operation comprises writing the plurality of backup images to the set of storage devices.

10. The system of claim 9, wherein
the list comprises a plurality of fingerprint values, and
each fingerprint value of the plurality of fingerprint values identifies a storage location for a block, a disk value, and an offset value.

11. The system of claim 9, wherein the program instructions are further executable to sort the plurality of fingerprint values.

12. The system of claim 9, wherein
the plurality of backup images comprises backup images of an object, and
the plurality of backup images comprises deduplicated data.

13. The system of claim 9, wherein
the writing is performed in an order specified by the list.

14. The system of claim 9, wherein the program instructions are further executable to create a map that identifies a plurality of storage locations for each backup image written to the set of storage devices.

15. The system of claim 9, wherein the program instructions are further executable to restore an object using a selected backup image of the plurality of backup images stored on the set of storage devices.

16. A non-transitory computer readable storage medium comprising program instructions executable to:
in response to a request to perform an archive operation, detect an amount of storage in a set of storage devices, wherein
the set of storage devices comprises a tape drive, and
the amount of storage is available for access at one time;
select a backup image of a plurality of backup images to be included in the archive operation;
prior to initiating the archive operation, compare a size of the backup image to the amount of storage,
add information identifying the backup image to a list, wherein
the list identifies the plurality of backup images, and
the plurality of images are to be included in the archive operation; and
perform the archive operation, wherein
performance of the archive operation comprises writing the plurality of backup images to the set of storage devices.

17. The non-transitory computer readable storage medium of claim 16, wherein
the list comprises a plurality of fingerprint values, and
each fingerprint value of the plurality of fingerprint values identifies a storage location for a block, a disk value, and an offset value.

18. The non-transitory computer readable storage medium of claim 16, wherein
the plurality of backup images comprises backup images of an object, and
the plurality of backup images comprises deduplicated data.

19. The non-transitory computer readable storage medium of claim 16, wherein the program instructions are further executable to create a map that identifies a plurality of storage locations for each backup image written to the set of storage devices.

20. The non-transitory computer readable storage medium of claim 16, wherein the program instructions are further executable to restore an object using a selected backup image of the plurality of backup images stored on the set of storage devices.

* * * * *